J. N. PENINGTON & J. W. CHILTON.
HAY HOOK.
APPLICATION FILED APR. 7, 1908.
931,339.
Patented Aug. 17, 1909.
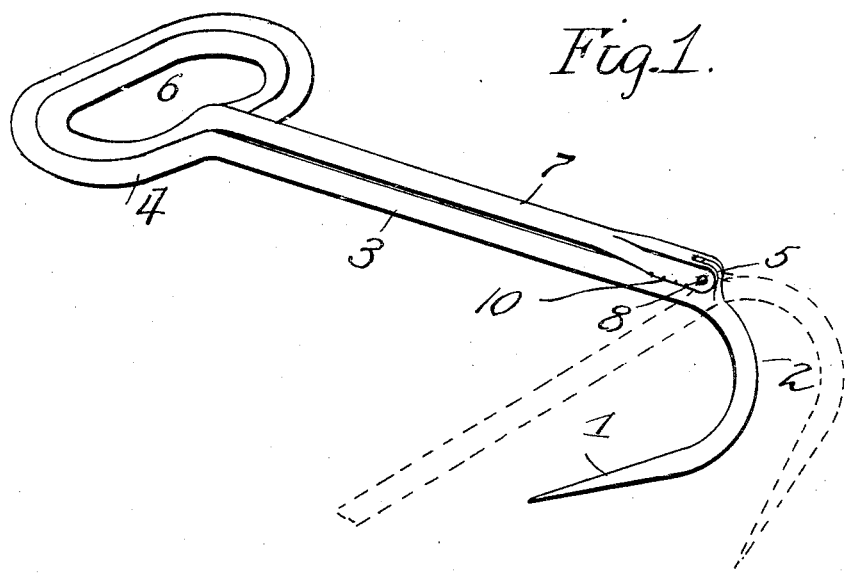
*Fig.1.*
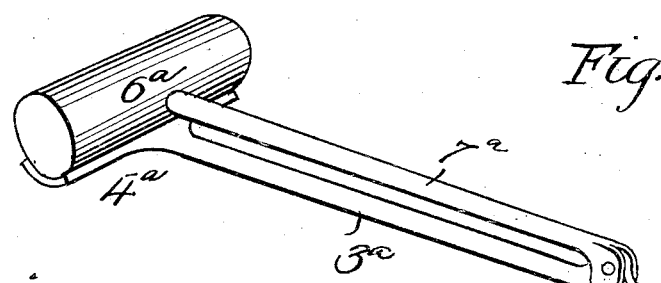
*Fig.2.*
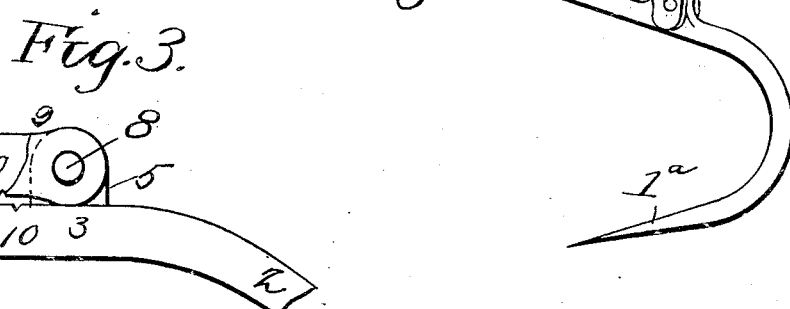
*Fig.3.*
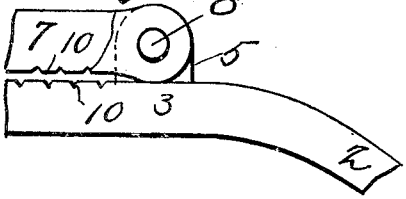
Witnesses
Hugh H. Ott
J. W. Garner
Inventors
John N. Penington
James W. Chilton
By Victor J. Evans
Attorney

UNITED STATES PATENT OFFICE.

JOHN N. PENINGTON AND JAMES W. CHILTON, OF BROKEN ARROW, OKLAHOMA.

HAY-HOOK.

No. 931,339.  Specification of Letters Patent.  Patented Aug. 17, 1909.

Application filed April 7, 1908. Serial No. 425,767.

*To all whom it may concern:*

Be it known that we, JOHN N. PENINGTON and JAMES W. CHILTON, citizens of the United States, residing at Broken Arrow, in the county of Tulsa and State of Oklahoma, have invented new and useful Improvements in Hay-Hooks, of which the following is a specification.

This invention is an improved hand hook for use in handling commodities such as bales of hay, cotton and the like and also for handling commodities in sacks or bags, the object of the invention being to provide a hand hook with means whereby when the hook is released it will automatically disengage itself from the bale, sack or bag.

With the above and other objects in view, the said invention consists of a hand hook having a fixed handle and also having a releasing handle pivotally connected thereto as hereinafter described and claimed.

In the accompanying drawings, Figure 1 is a perspective view of a hand hook constructed in accordance with our invention. Fig. 2 is a similar view showing a modified construction. Fig. 3 is a detail elevation on a larger scale.

The hook embodying this invention has the bill 1, bend 2, the stem 3 and the handle 4 at the outer end of the stem. In the form of the invention shown in Fig. 1, the handle 4 is of substantially elliptical form. In the form of the invention shown in Fig. 2, the fixed handle 4ª is transversely disposed with reference to the stem 3ª and is semi-tubular, or substantially so, its concave side being on the upper or outer side of the stem 3ª, that is to say, it is on the side of the stem opposite that through which the bill 1ª projects.

At a suitable point on the stem, preferably near the bend 2 is a lateral projection or lug 5. The releasing handle 6 which is adapted in the form of the invention shown in Fig. 1 to lie within or nest with reference to the fixed handle 4 and is substantially elliptical in form, is provided with a stem or rod 7 the outer end of which is bifurcated and pivotally connected to the lug 5 of the hook as at 8. In the form of the invention shown in Fig. 2, the releasing handle 6ª is substantially cylindrical in form, is disposed transversely with reference to its stem 7ª and is adapted to lie in the concave side of the fixed handle 4ª when the stem 7ª is parallel with the stem 3ª.

The stems of the hook and releasing handle are provided in their opposing sides near their pivotal connection 8 with notches 9 between which are formed teeth or serrations 10 which are adapted to be readily engaged with bagging or sacking when the stems 3 and 7 are closed upon the same, thus enabling a bag or sack to be readily gripped and handled without the necessity of inserting the bill of the hook therein.

In the operation of this improved hand hook, the user initially closes the releasing handle against the fixed handle and grasps both of them with one hand and wields the hook in the customary manner to embed its bill in the bale, or other package. In order to disengage the hook from the bale, the user, while retaining his grasp on the releasing handle and drawing upon the same, releases the fixed handle of the hook, whereupon the weight of the load on the bill of the hook causes the hook to turn to dispose the bill parallel or substantially so with respect to the stem of the releasing handle and hence the hook becomes automatically disengaged from the bale. The position of the hook while becoming thus disengaged is indicated in dotted lines in Fig. 1.

It is not desired that the construction of the invention be limited to either of the forms here shown, as it is evident that other modification may be made within the scope of the appended claims.

Having thus described the invention, what we claim as new and desire to secure by Letters Patent is:—

1. A hand hook having a bill at one end and a handle for manual grasping at the opposite end of its stem, and further provided with a releasing handle for manual grasping, said releasing handle having a stem pivotally connected to that of the hand hook and lying on the rear side of the hand hook, the length of the stems between the pivot and the handles being such that the releasing handle is foldable against the handle of the hook so that both of said handles may be simultaneously grasped by the same hand and the handle of the hand hook may be released while the grasp of the releasing handle is retained.

2. A hand hook having a bill at one end and a handle for manual grasping at the opposite end of its stem and further provided with a releasing handle for manual grasping, said releasing handle having a stem disposed on the rear side and pivotally connected to the stem of the hook, the length of the stems between the pivot and the handles being such that the releasing handle is foldable against the handle of the hook so that both of said handles may be simultaneously grasped by the same hand and the handle of the hand hook may be released while the grasp of the releasing handle is retained.

3. A hand hook having a bill at one end and a handle for manual grasping at the opposite end of its stem and further provided with a releasing handle for manual grasping, said releasing handle having a stem disposed on the rear side and pivotally connected to the stem of the hook, the length of the stems between the pivot and the handles being such that the releasing handle is foldable against the handle of the hook so that both of said handles may be simultaneously grasped by the same hand and the handle of the hand hook may be released while the grasp of the releasing handle is retained, said stems having gripping surfaces on their opposing sides, near the pivot, for the purpose set forth.

In testimony whereof we affix our signatures in presence of two witnesses.

JOHN N. PENINGTON.
JAMES W. CHILTON.

Witnesses:
F. S. HURD,
E. W. CRAIG.